(12) United States Patent
Katagami

(10) Patent No.: US 6,701,894 B2
(45) Date of Patent: Mar. 9, 2004

(54) KNOCKING CONTROL APPARATUS FOR INTERNAL COMBUSTION ENGINE

(75) Inventor: Masaki Katagami, Kobe (JP)

(73) Assignee: Fujitsu Ten Limited, Kobe (JP)

(*) Notice: Subject to any disclaimer, the term of this patent is extended or adjusted under 35 U.S.C. 154(b) by 70 days.

(21) Appl. No.: 10/151,254

(22) Filed: May 21, 2002

(65) Prior Publication Data

US 2002/0195085 A1 Dec. 26, 2002

(30) Foreign Application Priority Data

May 31, 2001 (JP) ..................................... 2001-165403

(51) Int. Cl.⁷ ................................................. F02P 5/00
(52) U.S. Cl. ............................. 123/406.33; 123/406.39
(58) Field of Search ........................ 123/406.29, 406.33, 123/406.34, 406.37, 406.38, 406.39

(56) References Cited

U.S. PATENT DOCUMENTS 5,035,219 A * 7/1991 Ohkumo et al. ....... 123/406.33

2003/0005749 A1 * 1/2003 Nishimura ............... 73/35.01

FOREIGN PATENT DOCUMENTS

JP    A 8-177697    7/1996

* cited by examiner

Primary Examiner—Hieu T. Vo
Assistant Examiner—Hai Huynh
(74) Attorney, Agent, or Firm—Oliff & Berridge, PLC

(57) ABSTRACT

The decision period in which an output of a knock sensor is extracted is set by a setting unit in response to an output of a crank angle sensor. The set decision period is stored in a storing unit and is changed by a changing unit 14 to contain the output of the knocking in response to an output of a processing circuit. In addition, the processing circuit corrects the decision period stored in the storing unit to reduce a difference between the changed decision period and the decision period stored in the storing unit. According to this, since the decision period can be corrected to contain the sensed output of the knocking in response to the variation of the knocking occurring timing, the knocking sensing precision can be improved.

8 Claims, 8 Drawing Sheets

KNOCKING CONTROL APPARATUS FOR INTERNAL COMBUSTION ENGINE

The present disclosure relates to a subject matter contained in Japanese Patent Application No.2001-165403 filed on May 31, 2001, which is incorporated herein by reference in its entirety.

BACKGROUND OF THE INVENTION

1. Field of the Invention

The present invention relates to a knocking control apparatus used preferably in ignition timing control of an internal combustion engine, etc.

2. Description of the Related Art

The spark ignition internal combustion engine can get the higher output if the compression ration of the mixed gas is increased higher. In this case, if the compression ration is increased, sometimes the unburned gas is burst up prior to the flame during the propagation of the flame in the cylinder after the spark is sent off into the mixed gas being sucked into the cylinder, i.e., the so-called knocking occurs. If the knocking occurs in the internal combustion engine, not only the engine operates irregularly because the pressure is applied irregularly to the piston but also the engine temperature is increased to lower the thermal efficiency, so that the engine output is lowered. Therefore, in the internal combustion engine, it is decided whether or not the knocking is occurring and then the control to suppress the knocking occurrence is executed by adjusting the ignition timing, for example, if the knocking is occurring.

There is the method that the knock sensor made of the piezoelectric element, or the like is provided in the cylinder and then the decision of the knocking in the internal combustion engine is carried out based on the output of the knock sensor. When the spectrum of the output of the knock sensor is picked up, the output sensed when the knocking occurs becomes larger than that sensed when the knocking does not occur. The difference between the output obtained when the knocking occurs and the output obtained when the knocking does not occur is not uniform over the full frequency of the output of the knock sensor, and appears prominently at the particular frequencies. The frequency at which the difference of the outputs appears remarkably is called the resonance frequency.

The knock sensor whose sensing range is limited only to the resonance frequency band in which the difference of the outputs is large is called the resonance-type knock sensor. In the resonance-type knock sensor, the particular frequency is decided previously by the setting of the sensor itself. That is, the resonance frequency is identified/set to the frequency band, in which it is roughly predicted that the difference of the outputs is increased commonly, at the sacrifice of the characteristics, which are different every cylinder of the internal combustion engine, the states such as the engine speed, etc., and the S/N ratio. Therefore, such resonance frequency of the resonance-type knock sensor employed in the mass-produced same-type internal combustion engine is set equal. However, as described above, the resonance frequency is different every type of the internal combustion engine, and is different based on the engine speed of the internal combustion engine and the individual cylinder of the internal combustion engine. As a result, the resonance-type knock sensor, whose resonance frequency is uniformly fixed, cannot sense the knocking, which occurs in the case that such resonance frequency is not suited to the cylinder, the rotation speed, etc., with good precision.

Therefore, the flat sensor in which the frequency of the knock sensor is not fixed to the particular frequency is employed such that the setting of the flat sensor itself can be changed every type of the internal combustion engine, every engine speed, and every cylinder, i.e., the different resonance frequency can be set every flat sensor. However, since the resonance frequency being set once in one flat sensor is fixed in such flat sensor, the resonance frequency set in one flat sensor is deviated from the frequency at which the knocking occurs even if such frequency at which the knocking occurs is varied due to the time-dependent change, etc. As a result, the knocking cannot be sensed with good precision. That is, there is the problem that, even if the flat sensor is employed, the knocking cannot be sensed continuously for a long term with good precision.

The related art for overcoming this problem is disclosed in Patent Application Publication (KOKAI) Hei 8-177697, for example. According to this related art, the standard deviation is calculated in the level distribution of the output of the knock sensor, then the standard deviation is compared with the predetermined value, then it is decided that the resonance frequency is deviated if the standard deviation is below the predetermined value, and then the knocking sensing precision can be improved by correcting the resonance frequency.

This related art has following problems. The knocking decision period, i.e., the time point and the period to start the extraction of the output of the knock sensor, is fixed every knock sensor. Therefore, since the knocking occurring timing is shifted in the cycle of the internal combustion engine with the time-dependent change of the internal combustion engine, in some cases the output of the knocking is positioned on the outside of the knocking decision period, and thus there is the problem such that the knocking cannot be sensed.

Also, in the cycle of the internal combustion engine, there is the phenomenon such that the vibration is generated at the ignition timing, the seating timing of the suction and exhaust valve, etc. based on the causes except the knocking. These outputs of the vibration by the knock sensor due to the ignition timing, the seating timing of the suction and exhaust valve, etc. are the noises that act as the trouble in sensing the knocking. Because the knocking occurring timing is shifted, there is the case where both the output of the vibration due to the knocking and the noise are contained in the knocking decision period. If both the output of the knocking and the noise are contained in the knocking decision period, it is difficult to discriminate the output of the knocking from the noise. Thus, there is the problem such that the knocking sensing precision is lowered.

It is an object of the present invention to provide a knocking control apparatus for an internal combustion engine, capable of correcting a knocking decision period so as to respond to a variation in a knocking occurring timing and also achieving an excellent knocking sensing precision.

SUMMARY OF THE INVENTION

The present invention provides a knocking control apparatus for an internal combustion engine, having a knock sensor for sensing a knocking of the internal combustion engine, a crank angle sensor for sensing a rotation angle position of a crank provided to the internal combustion engine, a setting unit for setting a decision period in which an output of the knock sensor is extracted to decide whether the knocking occurs in response to an output of the crank angle sensor, a storing unit for storing the decision period, a changing unit for changing the set decision period to contain the output of the knock sensor in response to the knocking with a situation in which the knocking occurs, a calculating unit for calculating a difference between the decision period, which is changed to contain the output of the knock sensor in response to the knocking, and the decision period, which is stored in the storing unit, and a correcting unit for correcting the decision period stored in the storing unit in response to an output of the calculating unit to reduce an absolute value of the difference.

According to the present invention, the previously-set decision period can be changed by the changing unit to contain the output of the vibration generated by the knocking, and also the difference between the changed decision period and the decision period stored in the storing unit is calculated and then the decision period stored in the storing unit can be corrected based on the calculated result. According to this, even if the knocking occurring timing is varied in the cycle of the internal combustion engine, the decision period can be changed to respond to the knocking occurring timing and thus the knocking can be sensed with good precision. Also, since the decision period stored in the storing unit based on the decision period that has been changed to respond to the knocking occurring timing, can be corrected, the corrected decision period that can answer to the knocking occurring timing with good precision can be employed to sense the knocking when the internal combustion engine is operated under the same conditions.

Also, in the present invention, the decision period is a time point t1, which is defined in a cycle of the internal combustion engine, and a period w1, which lapses from the time point t1 as a starting point.

Also, according to the present invention, the decision period consists of the time point t1 and the period w1 decided in the cycle of the internal combustion engine, and the decision period can be set or changed by selecting any one or both of the time point t1 and the period w1 so as to respond to the knocking occurring timing. Therefore, the improvement of the knocking sensing precision can be achieved.

Also, in the present invention, the time point t1 is defined differently every cylinder of the internal combustion engine. The time point t1 is defined to be lagged in the cycle of the internal combustion engine as an engine rotation speed is increased higher. The time point t1 is defined to be lagged in the cycle of the internal combustion engine as a fuel injection quantity is reduced smaller.

Also, according to the present invention, the time point t1 of the decision period is decided every cylinder of the internal combustion engine in response to the operation conditions such as the engine speed, the fuel injection quantity, etc. According to this, even if the operation state is different every cylinder, the decision period is set respectively to the timing at which the knocking occurring frequency is high. Therefore, the improvement of the knocking sensing precision can be achieved.

Also, the present invention provides the knocking control apparatus, further having deciding unit for deciding whether the output of the knock sensor contains a noise that is a sensed output of a vibration other than a vibration that is generated by the knocking. If the output of the knock sensor contains the noise, the changing unit changes the decision period in response to an output of the deciding unit.

Also, in the present invention, the deciding unit calculates number of a peak value of the output of the knock sensor, which exceeds a predetermined decision level, in the decision period. The deciding unit decides that the output of the knock sensor contains the noise if the number of the peak value exceeds a predetermined decision value.

Also, according to the present invention, the deciding unit for deciding whether or not the output of the knock sensor contains the noise, based on the number of the peak value of the output of the knock sensor that exceeds the predetermined decision level, is provided, and the decision period is changed in response to the output of the deciding unit. According to this, since it can be decided whether or not the knocking occurs, based on the output of the knock sensor that does not contain the noise within the decision period, the knocking sensing precision can be improved. Also, since the noise deciding unit can be attained by the simple structure and there is no necessity to provide the noise sensing device separately, the size reduction of the system and the suppression of the production cost can be achieved.

Also, in the present invention, the calculating unit further calculates a difference between the decision period changed by the changing unit and a predetermined value. The changing unit changes an after-changing decision period to a before-changing decision period in response to the output of the calculating unit if the decision period is below the predetermined value.

Also, according to the present invention, if the changed decision period is smaller than the predetermined value, the changed decision period can be changed into the preceding decision period once again. According to this, it is possible to overcome the problem such that the decision period is set too short and thus it becomes difficult to catch the output of the knock sensor within the decision period.

Also, in the present invention, the decision period is a plurality of decision periods. The plurality of the decision periods are set in one cycle of the internal combustion engine.

Also, according to the present invention, plural decision periods can be provided in one cycle of the internal combustion engine. According to this, if a plurality of timings at which the knocking occurring frequency is high are present in the cycle, the decision periods can be decided respectively so as to respond to such plural timings at which the knocking occurring frequency is high. Also, since a plurality of decision periods are provided, the decision periods can be decided to avoid the noise occurring timing. Therefore, the improvement of the knocking sensing precision can be achieved.

Also, in the present invention, the deciding unit counts numbers of the peak value of the output of the knock sensor, which exceeds a predetermined decision level, in each of decision periods set in one cycle of the internal combustion engine. The deciding unit decides based on a sum of the numbers whether the output of the knock sensor contains a noise.

Also, according to the present invention, the presence of the knocking occurrence is decided based on the logical sum of the knocking sensor outputs in plural decision periods. Therefore, the knocking sensing precision can be improved.

BRIEF DESCRIPTION OF THE DRAWINGS

Exemplary embodiments will be described with reference to the drawings, in which like reference numerals represent like parts, and wherein.

DETAILED DESCRIPTION OF THE EMBODIMENTS

Figure 1:
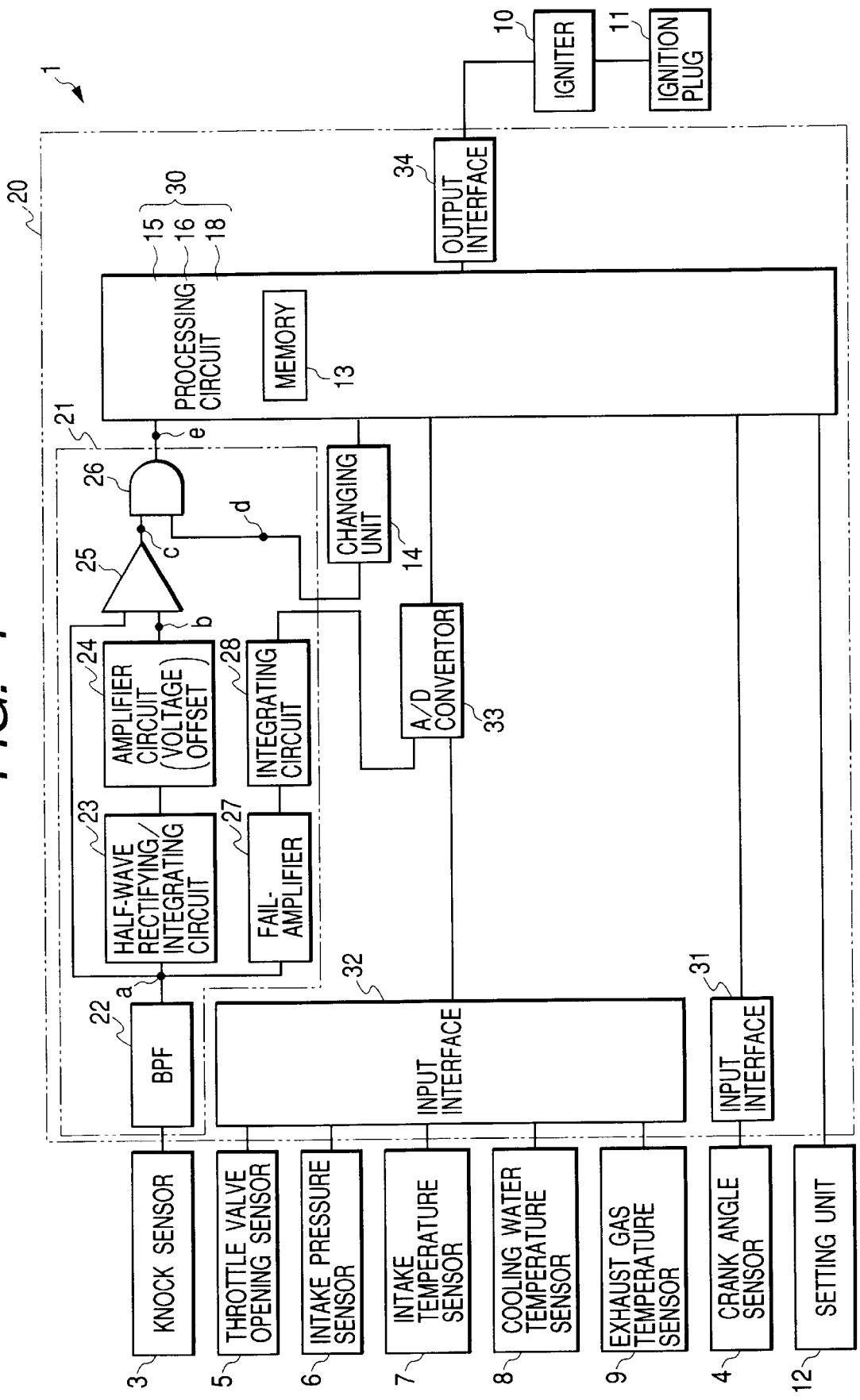
FIG. 1 is a block diagram showing a knocking control apparatus 1 for an internal combustion engine according to an embodiment of the present invention.
Figure 2:
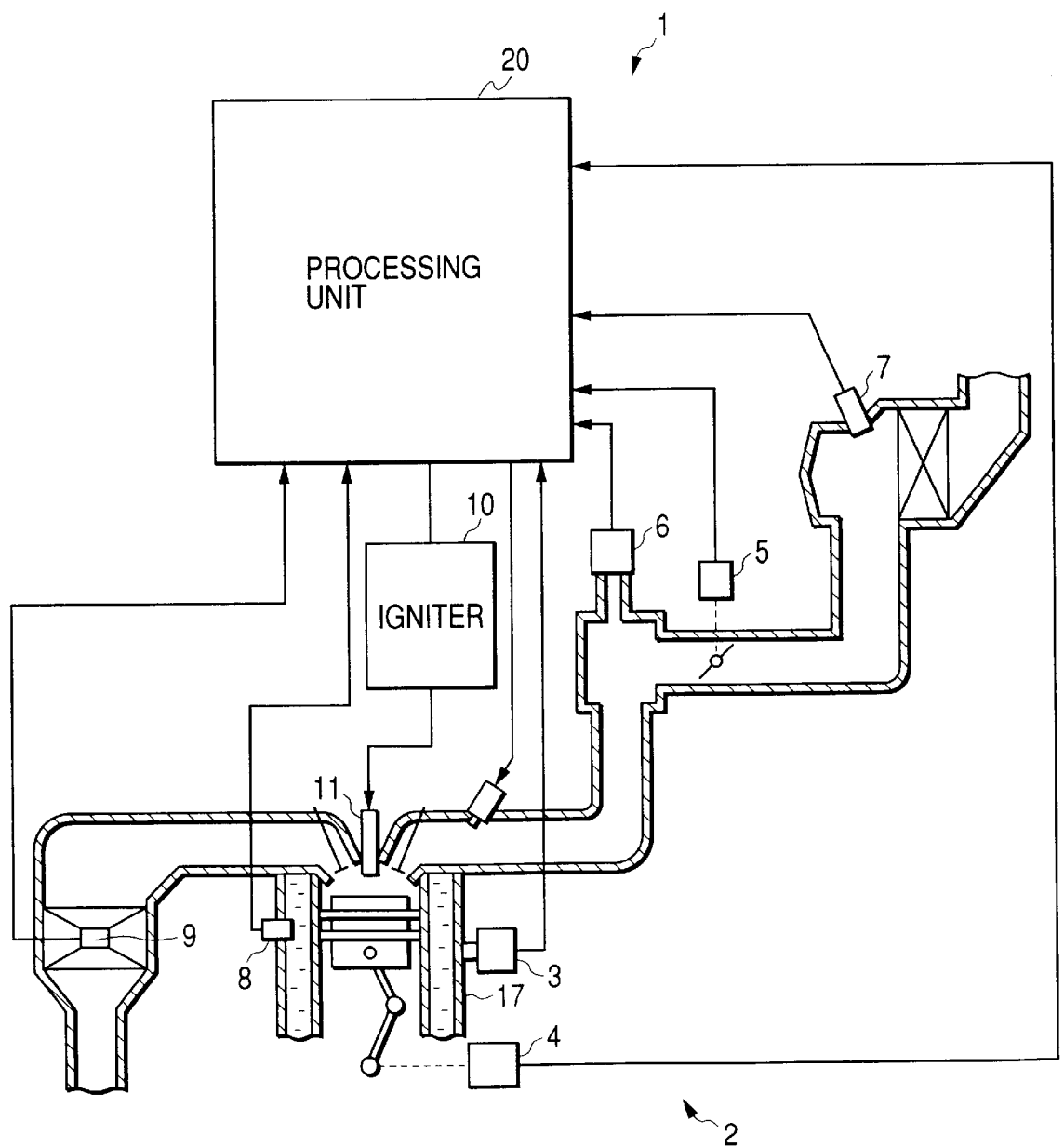
FIG. 2 is a system diagram showing a configuration of an internal combustion engine 2 having the knocking control apparatus 1 shown in FIG. 1 in a simplified manner.

FIG. 1 is a block diagram showing a knocking control apparatus 1 for an internal combustion engine according to an embodiment of the present invention. FIG. 2 is a system diagram showing a configuration of an internal combustion engine 2 having the knocking control apparatus 1 shown in FIG. 1 in a simplified manner. The knocking control apparatus 1 for the internal combustion engine (referred simply to as the "knocking control apparatus" hereinafter) can adjust an ignition timing of an ignition plug 11 based on sensed results of a knock sensor 3, a crank angle sensor 4, and other sensors such as a throttle vale opening sensor 5, an intake pressure sensor 6, an intake temperature sensor 7, a cooling water temperature sensor 8, and an exhaust gas temperature sensor 9 via an igniter 10 so as to control the knocking.

The knocking control apparatus 1 includes the knock sensor 3, the crank angle sensor 4, other sensors 5 to 9, a setting unit 12, and a processing unit 20. The knock sensor 3 senses the knocking of the internal combustion engine 2. The crank angle sensor 4 senses the rotation angle position of a crank provided in the internal combustion engine 2. The setting unit 12 sets a decision period in which an output sensed by the knock sensor 3 is extracted to decide whether or not the knocking occurs in response to an output of the crank angle sensor 4. The processing unit 20 includes a storing unit 13, a changing unit 14, a calculating unit 15, a correcting unit 16, and a deciding unit 18. The storing unit 13 stores the decision period. The changing unit 14 changes the set decision period to contain the sensed output of the knock sensor 3, which corresponds to knocking in a situation in which the knocking occurs. The calculating unit 15 calculates a difference between the decision period, which is changed to contain the sensed output of the knock sensor 3 corresponding to the knocking, and the decision period stored in the storing unit 13. The correcting unit 16 corrects the decision period stored in the storing unit 13 in response to an output of the calculating unit 15 to reduce an absolute value of the difference. The deciding unit 18 decides whether or not the sensed output of the knock sensor 3 contains noise.

The knock sensor 3 is a sensor that is made of a piezoelelctric element or the like for sensing vibration and is fixed to a cylinder 17 of the internal combustion engine 2. The sensed output of the knock sensor 3 is input into a signal processing circuit 21 contained in the processing unit 20. This signal processing circuit 21 contains a band-pass filter (abbreviated as a "BPF" hereinafter) 22, a half-wave rectifying/integrating circuit 23, an amplifier circuit (voltage offset) 24, a comparing circuit 25, an AND circuit 26, a fail-amplifier 27 and an integrating circuit 28.

Figure 3:
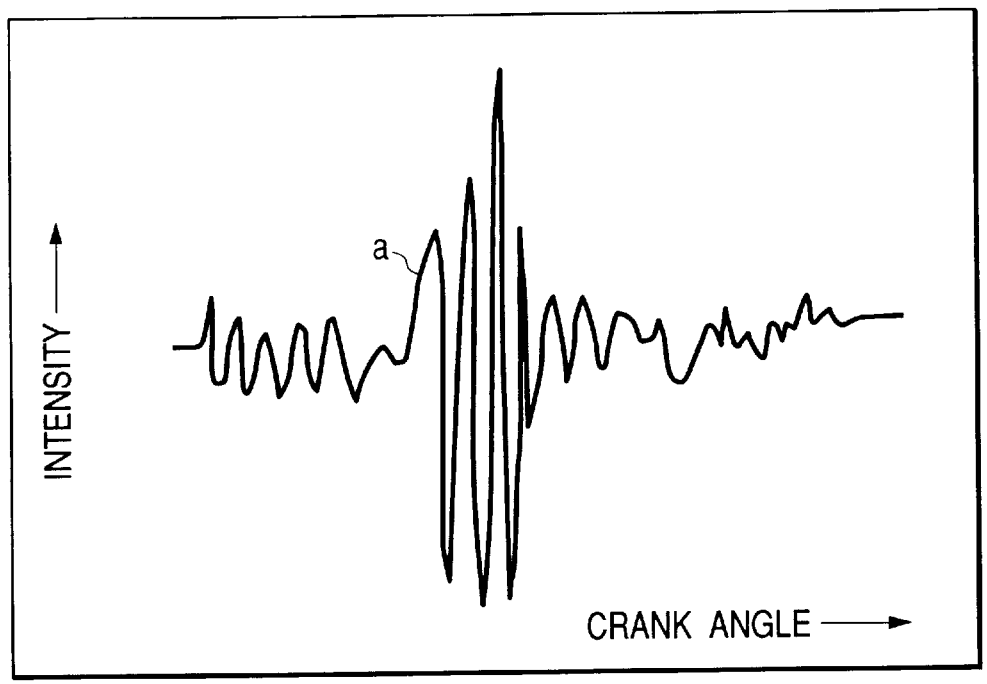
FIG. 3 is a view showing a signal a in a signal processing circuit 21 in a simplified manner.
Figure 4:
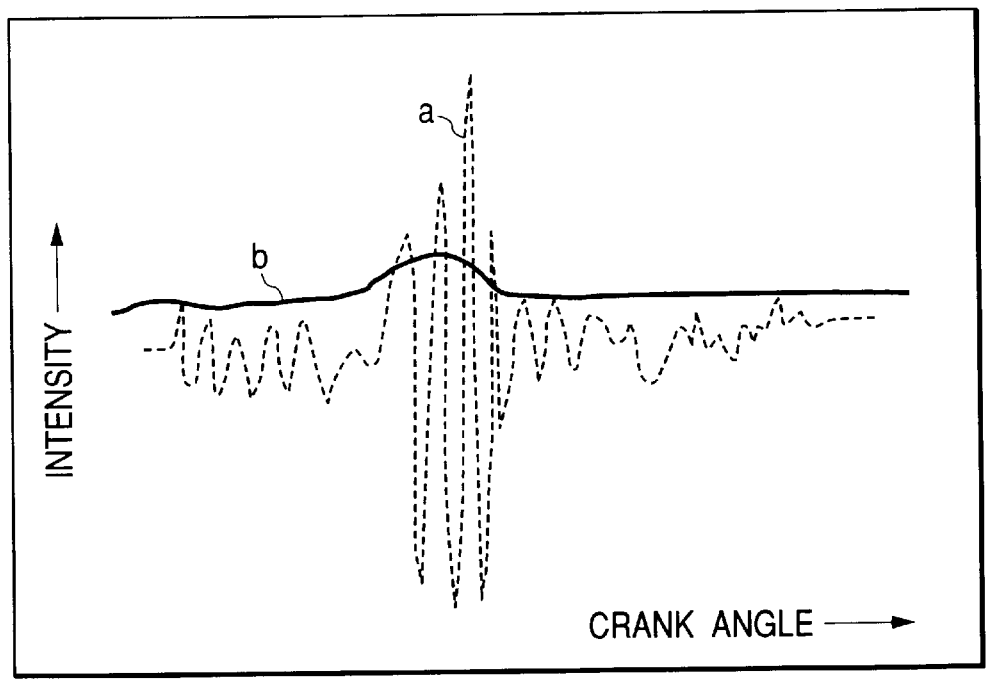
FIG. 4 is a view showing a signal b in the signal processing circuit 21 in a simplified manner.

FIGS. 3 to 7 are views showing signals a toe at respective portions in the signal processing circuit 21 in a simplified manner. The BPF 22 only passes a signal in a frequency band in which there is a possibility that signal components based on the knocking (called a "knock signal" hereinafter) appear. Frequencies in a range of about 5 kHz to about 12 kHz, for example, are selected as the frequency band. FIG. 3 shows a state of a signal a filtered by the BPF 22. The half-wave rectifying/integrating circuit 23 rectifies and integrates one side components of the signal, which is filtered by the BPF 22, with respect to a reference level thereof. The amplifier circuit (voltage offset) 24 amplifies the intensity of the half-wave rectified/integrated signal and also executes a voltage offset process. The intensity of the half-wave rectified/integrated signal is set as a decision level that is used to sense a peak value of the sensed output of the knock sensor 3 and to count number of the peak value. FIG. 4 shows a signal b that is half-wave rectified/integrated and then amplified.

Figure 5:
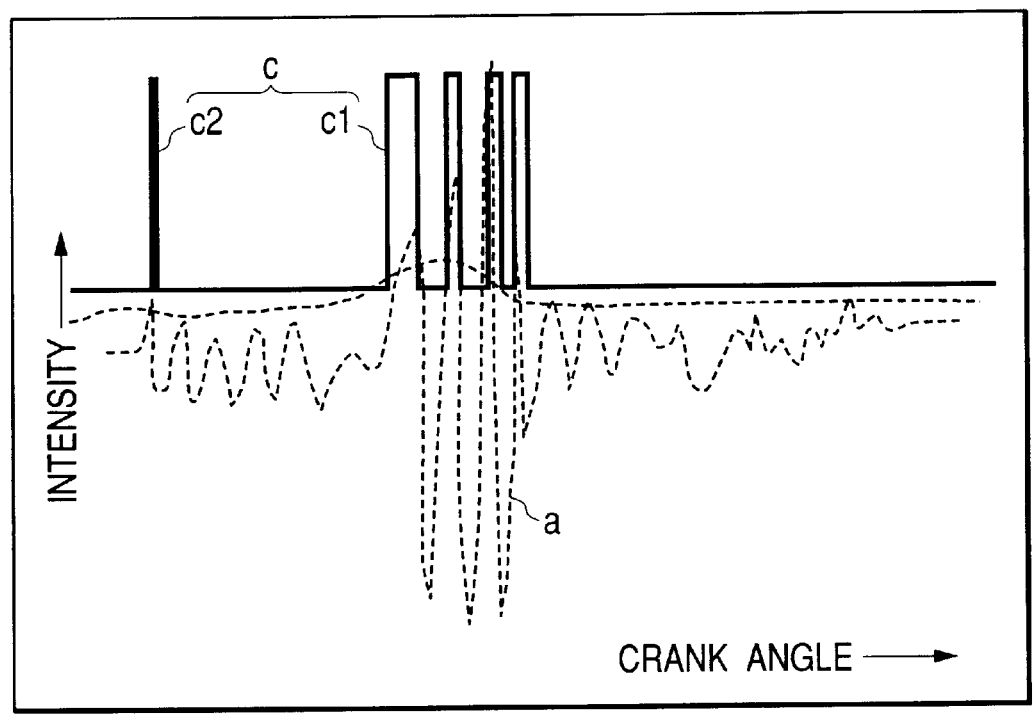
FIG. 5 is a view showing a signal c in the signal processing circuit 21 in a simplified manner.
Figure 6:
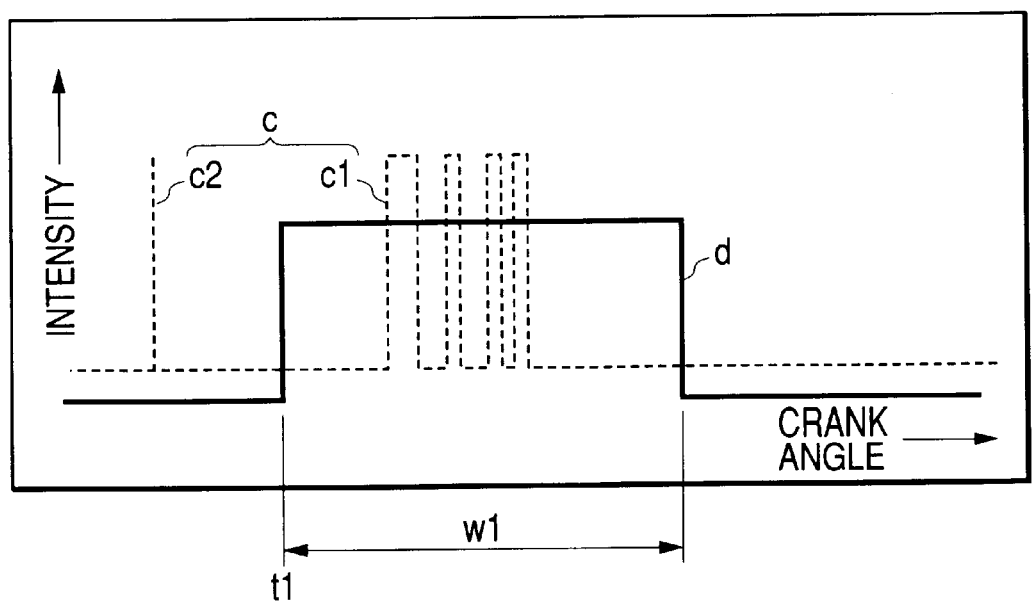
FIG. 6 is a view showing a signal d in the signal processing circuit 21 in a simplified manner.
Figure 7:
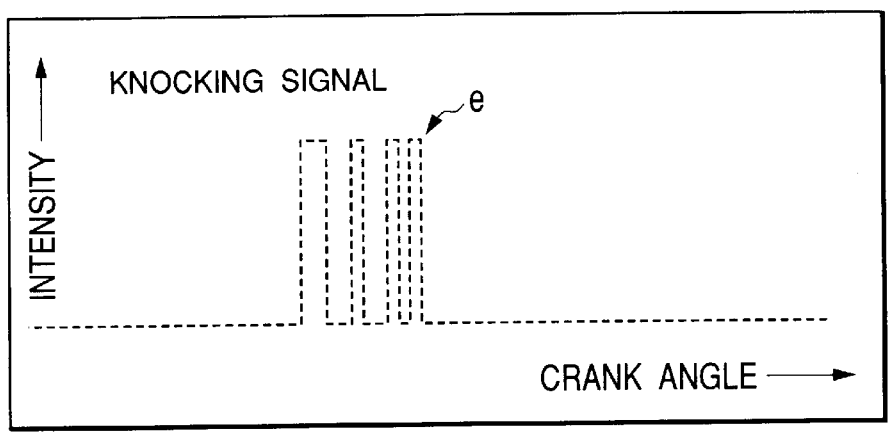
FIG. 7 is a view showing a signal e in the signal processing circuit 21 in a simplified manner.

The comparing circuit 25 picks up a signal, intensity of which is not less than the intensity of the half-wave rectified/integrated signal b, i.e., the decision level, from the signal a that is filtered by the BPF 22, and then converts the signal of the sensed output of the knock sensor 3 into a signal c constructed by peak values shown in FIG. 5. The peak waveform signal c shown in FIG. 5 contains knock signals c1, which is sensed outputs of the knocking, and a noise c2, which are generated at the ignition timing, etc. The AND circuit 26 calculates a logical product of a decision period d shown in FIG. 6 and the peak waveform signal c shown in FIG. 5 to extract only the knock signals c1 and constitutes a peak waveform signal e consisting only of a knocking signal shown in FIG. 7. The knocking signal e shown in FIG. 7 is input into a processing circuit 30 contained in the processing unit 20.

The fail-amplifier 27 and the integrating circuit 28 are used to decide abnormality of the knock sensor 3. The signal from the knock sensor 3 is amplified up to a level, which can be decided by the fail-amplifier 27, then is smoothed by the integrating circuit 28, and then is input into an analog/digital (A/D) converter 33. Then, the processing circuit 30 compares an output of the A/D converter 33 with a predetermined decision level to decide whether or not the abnormality occurs.

The decision period is a time point t1, which is defined in the cycle of the internal combustion engine 2, and a period w1, which is a lapsed time from the time point t1 as a starting point. In the present embodiment, the time point t1 is given by a crank angle (abbreviated as a "CA" hereinafter) after a piston in the cylinder passes firstly through a top dead center in the internal combustion engine 2 after the ignition (abbreviated as a "ATDC (After Top Death Center)" hereinafter) The period w1 is given by a crank angle range at the ATDC.

The setting unit 12 is an input unit for inputting the decision period into the processing unit 20. The input unit 12 can be implemented, for example, by storing the decision period previously in ROM (Read Only Memory) to correspond to type, cylinder, and operation conditions of the internal combustion engine 2, and then reading the stored decision period simultaneously with start of an operation of the internal combustion engine 2 to input the decision period into the processing unit 20. The storing unit 13 for storing the decision period input from the input unit 12 is a memory and contains ROM and RAM (Random Access Memory). The decision period is stored in the random access memory, i.e., RAM, which can be written into and read out at any time.

As shown in Table 1, the decision period stored previously in the ROM of the input unit 12 is defined differently every cylinder of the internal combustion engine. The decision period may be defined to increase the crank angle (CA) at the time point t1 as engine speed becomes higher or fuel injection quantity becomes smaller. According to this, even if the operation condition is set differently every cylinder, the decision periods can be set respectively in response to a period in which the knocking occurring frequency is high.

TABLE 1

| Injection Time [ms] | Rotation Speed [rpm] | | | | |
|---|---|---|---|---|---|
| | 1000 | 2000 | 3000 | 4000 | 5000 |
| 2 | 30–40 | 40–50 | 40–50 | 40–50 | 40–50 |
| 4 | 20–30 | 30–40 | 40–50 | 40–50 | 40–50 |
| 6 | 10–20 | 20–30 | 30–40 | 40–50 | 40–50 |
| 8 | 10–20 | 10–20 | 20–30 | 30–40 | 40–50 |
| 10 | 10–20 | 10–20 | 10–20 | 20–30 | 30–40 |

In Table 1, for example, 30–40 is the ATDC crank angle [CA]. 30 indicates the time point t1. (40–30) indicates the period w1.

The processing circuit 30 serving as the calculating unit 15, the correcting unit 16, and the deciding unit 18 can be implemented by a microcomputer that is constructed by CPU (Central Processing Unit), etc. and others. As described above, the calculating unit 15 calculates the difference between the decision period, which is changed by the changing unit 14 to contain the knocking signal, and the decision period, which is input from the input unit 12 to the processing circuit 30 and stored in the memory 13. Also, the calculating unit 15 calculates the difference between a period of the decision period, which is changed by the changing unit 14, and a predetermined value. Then, the calculating unit 15 outputs an instruction to the changing unit 14 to change the decision period obtained after the changing into the decision period obtained before the changing again if the changed period of the decision period is below the predetermined value.

The correcting unit 16 corrects the time point and the period of the decision period stored in the memory 13 such that the absolute value of the difference between the changed decision period as the result calculated by the calculating unit 15 and the decision period stored in the memory 13 is reduced. Also, the corrected decision period can be stored in RAM of the memory 13 over and over again.

The deciding unit 18 decides whether or not the output sensed by the knock sensor 3 contains the noise that is the sensed output other than the knocking signal. The deciding unit 18 counts the number of the peak value of the sensed output of the knock sensor 3 contained in the decision period, then decides that the sensed output of the knock sensor 3 contains the noise if the counted number is in excess of the predetermined value, and then outputs an instruction to the changing unit 14 to change the decision period.

As described above, the crank angle sensor 4 senses the rotation angle position of the crank and also senses the rotation speed of the crank. The sensed outputs are input into the processing circuit 30 via a first input interface 31 in the processing unit 20.

The changing unit 14 for changing the decision period can be implemented by a circuit having a gate switch, for example. A program prepared based on logic relating to the change of the decision period is stored previously in ROM in the memory 13. In response to the output of the processing circuit 30 that is output based on both the instruction of the program read from ROM and the output of the rotation angle position of the crank being sensed by the crank angle sensor 4, the changing unit 14 can change the decision period, that is provided in the cycle of the internal combustion engine, by changing one or both of a turn-ON start time and a turn-ON time of the gate switch.

In this case, in the start of the operation of the internal combustion engine 2, the changing unit 14 does not change the decision period but provides the decision period in the cycle of the internal combustion engine 2 as an initial value in response to the output of the processing circuit 30. More particularly, the time point t1 and the period w1 of the decision period being selected from the decision periods, which are input from the input unit 12 and are set previously every operation state shown in Table 1, for example, according to the combination of the engine speed output from the crank angle sensor 4 and the fuel injection time calculated based on the output of the throttle vale opening sensor 5 are provided to the changing unit 14 as the output of the processing circuit 30. Then, the changing unit 14 provides the decision period in the cycle of the internal combustion engine 2 in response to the output of the processing circuit 30.

The outputs of the sensors 5 to 9 to sense an operation state of the internal combustion engine 2 are given to the processing circuit 30 via a second input interface 32 and the A/D converter 33 provided in the processing unit 20. A control signal as an output of the processing circuit 30, which is obtained by processing such outputs as well as the sensed result of the knocking in the processing circuit 30, is given to the ignition plug 11 via an output interface 34 and an igniter 10 to control the ignition timing.

Figure 8:
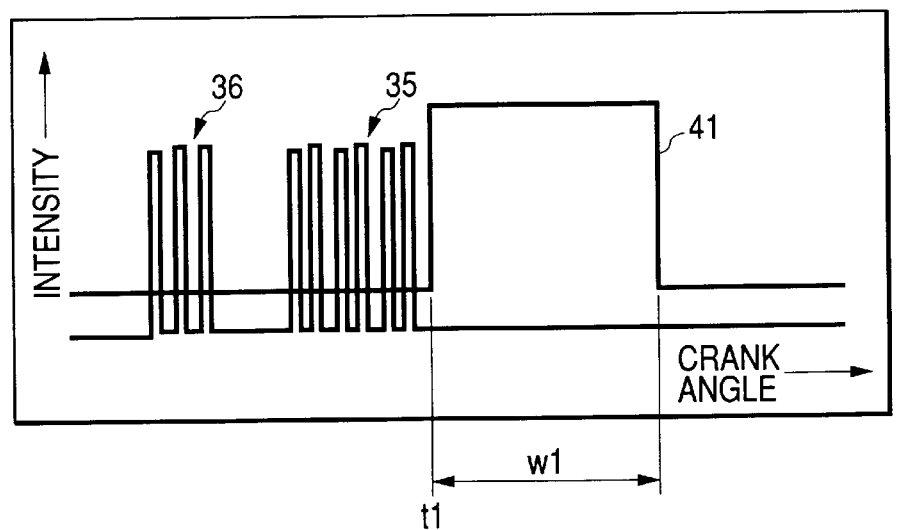
FIG. 8 is a view showing a state that a decision period 41 is not matched with a knocking occurring timing.
Figure 9:
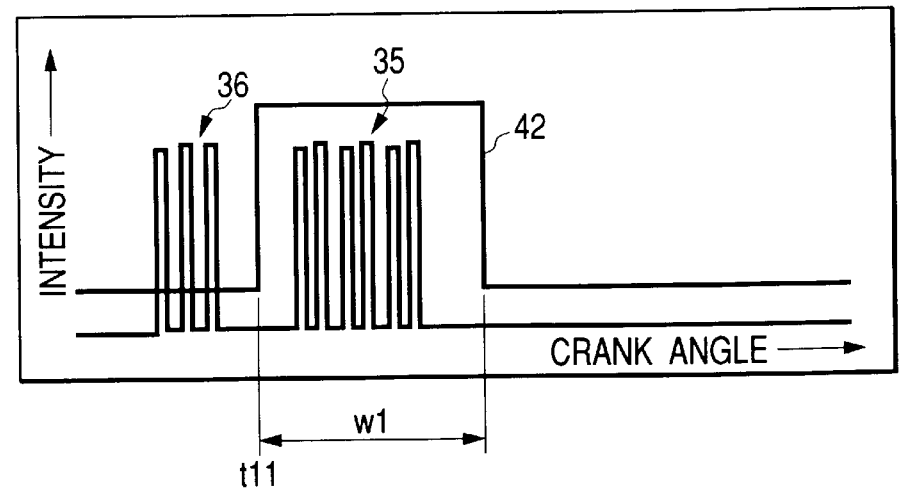
FIG. 9 is a view showing a state that a decision period 42 is matched with the knocking occurring timing.

FIG. 8 is a view showing a state in which the decision period 41 is not matched with the knocking occurring timing. FIG. 9 is a view showing a state in which the decision period 42 is matched with the knocking occurring timing. At the time of starting the operation of the internal combustion engine 2, the time point t1 and the period w1 of the decision period 41 are input into the processing circuit 30 from the input unit 12 and also the output of the crank angle sensor 4 is input into the processing circuit 30. Therefore, in response to the output of the processing circuit 30 generated based on these inputs, the changing unit 14 provides the decision period 41 that is defined by the ATDC crank angle (CA) and the crank angle range of the piston. However, sometimes the occurring timing of the knocking signal 35 is changed due to the time-dependent change accompanied with the operation of the internal combustion engine 2. As shown in FIG. 8, when the state in which the occurring timing of the knocking signal 35 is not matched with the decision period 41 is brought about, the knocking cannot be sensed although the knocking occurs. In order to enable the knocking signal 35 to be sensed, as shown in FIG. 9, the decision period 42 must be matched with the occurring timing of the knocking signal 35.

Figure 10:
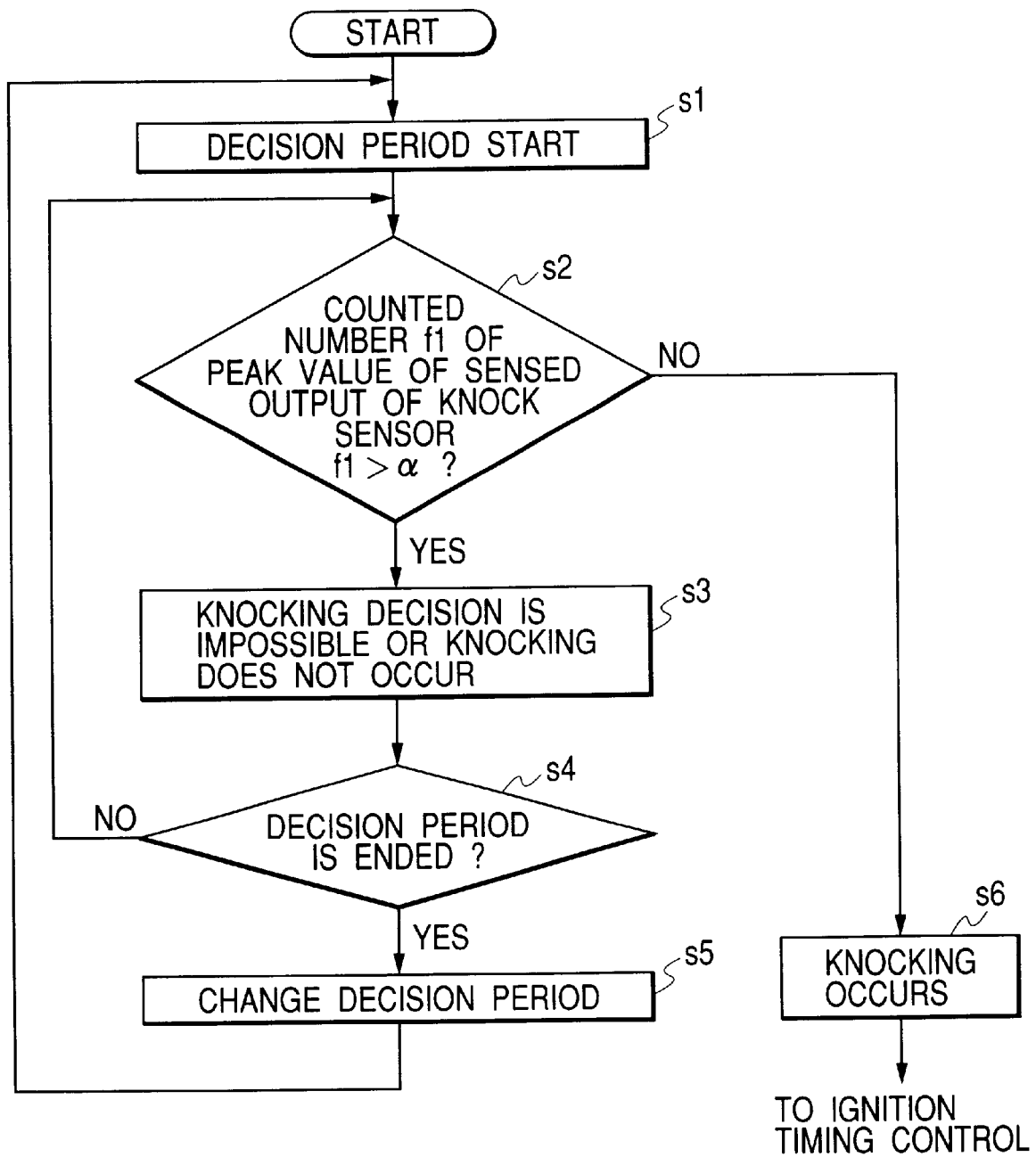
FIG. 10 is a flowchart explaining a changing operation of the decision period.

FIG. 10 is a flowchart explaining an operation of changing the decision period. The operation of changing the decision period so as to mate the decision period with the occurring timing of the knocking signal 35 when the occurring timing of the knocking signal 35 is not matched with the decision period will be explained with reference to a flowchart shown in FIG. 10. In step s1, the rotation angle position of the crank reaches to the time point t1 of the decision period that is set at ATDC and given by the crank angle (CA), and the decision period starts. In step s2, it is decided by the processing circuit 30 as the deciding unit 18 whether or not counted number f1 of the peak value of the output that is sensed by the knock sensor 3 and contained in the decision period exceeds a predetermined value, e.g., $\alpha$ (=6).

If this decision result is NO, the process goes to step s6. In step s6, according to the decision that the knocking is occurring, the knocking control is carried out by executing the ignition timing control of the ignition plug 11, in response to the output of the processing circuit 30 that is output based on the sensed output of knocking and the outputs of other sensors 5 to 9 that sense the operation state. If the above decision result is YES, the process goes to step s3.

In step s3, it is decided that the knocking decision is impossible or the knocking does not occur, and then the extraction of the output by the knock sensor 3 is continued. In step s4, it is decided whether or not the period w1 that elapses from the time point t1 of the decision period as a starting point is ended. If this decision is NO, the process goes back to step s2 and subsequent steps are repeated. If this decision is YES and also the decision period is ended, the process goes to step s5.

In step s5, in response to the output of the processing circuit 30 that is calculated in compliance with the program read out from the memory 13, as described above, the changing unit 14 changes the time point t1 of the decision period to t11 to contain the knocking signal 35. Although only the time point of the decision period is changed herein, both the time point and the period of the decision period may be changed. If the change of the decision period executed by the changing unit 14 is completed, the process goes back to step s1. Then, step s1 and subsequent steps are repeated based on the changed decision period.

Figure 11:
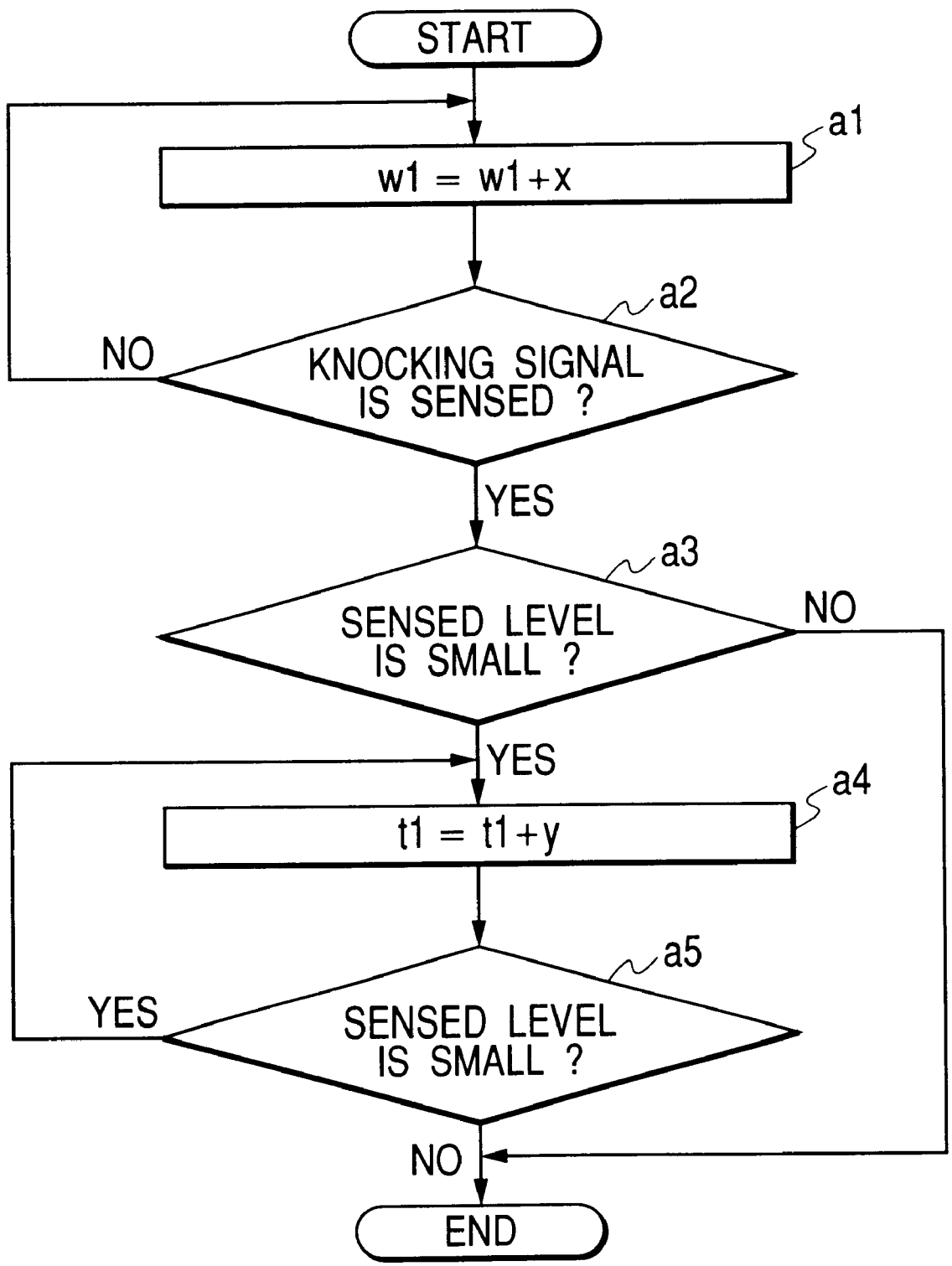
FIG. 11 is a flowchart explaining an example of a decision period changing logic.

Here, an example of a decision period changing logic will be given as follows, for instance. FIG. 11 is a flowchart explaining an example of the decision period changing logic. When the process goes to step s5 in the flowchart shown in above FIG. 10, the change of the decision period is executed based on the logic in the flowchart in FIG. 11.

In step a1, the period w1 of the decision period is replaced with the period w1 (=w1+x) that is set to extend to a lag angle side by x degree of the crank angle. In step a2, step s1 to step s4 shown in the flowchart in above FIG. 5 (for convenience, called the knocking sensing/deciding operation hereinafter) are executed based on the decision period having the replaced period w1, and thus it is decided whether or not the output of the knock sensor 3 is the knocking signal 35. If this decision is NO, the process returns to step a1. Then, the period w1 is further extended to the lag angle side by the x degree of the crank angle, and the knocking sensing/deciding operation is carried out.

If the decision in step a2 is YES and thus the knocking signal is sensed, the process goes to step a3. In step a3, it is decided whether or not the sensed level of the knocking signal is smaller than a predetermined decision level. If this decision is NO, the process goes to END and thus the change of the decision period based on the present logic is ended. Thus, it is decided that the knocking has occurred.

If the above decision is YES, the process goes to step a4. In step a4, the time point t1 of the decision period is replaced with the time point t1 (=t1+y) that is obtained by adding y degree of the crank angle to t1, i.e., is shifted to the lag angle side by the y degree. According to this, since the starting time point of the decision period is lagged by the y degree of the crank angle, a length of the period w1 of the decision period is shortened by the y degree of the crank angle. The sensed output in which the knocking signal is highlighted with respect to the ground level of the output of the knock sensor 3 can be obtained by sensing the knocking signal while using the decision period whose period w1 is shortened.

In step a5, the knocking sensing/deciding operation is carried out based on the decision period having the replaced time point t1, and thus it is decided whether or not the sensed level of the knocking signal is smaller than a predetermined decision level. If this decision is NO, the process goes to END and thus the change of the decision period based on the present logic is ended. Thus, it is decided that the knocking has occurred. If the above decision is YES, the process goes back to step a4. Then, the time point t1 is further shifted to the lag angle side by the y degree, and the above knocking sensing/deciding operation is carried out.

The decision period changing logic is not limited to the example shown in the flowchart in FIG. 11. In the example shown in the flowchart in FIG. 11, both the period w1 and the time point t1 are lagged by the x degree and the y degree of the crank angle respectively. In this case, such a logic may be employed that, if the knocking signal cannot be sensed after the period w1 and the time point t1 are lagged by the predetermined step respectively, the period w1 and the time point t1 are returned to the initial values and then are led gradually. Also, if a plurality of decision periods are set in one cycle of the internal combustion engine 2, a logic for changing the time point and the period of a second decision period, which is constructed similarly to the flowchart shown in FIG. 11, may be added in place of END of the flowchart that explains the decision period changing logic shown in FIG. 11.

If the decision period is changed in this manner, the decision period can be set to respond to the knocking occurring timing, as shown in FIG. 9, even when the knocking occurring timing is varied in the cycle of the internal combustion engine 2. Therefore, the knocking can be sensed with good precision.

Also, when the decision period is changed by the changing unit 14 to contain the knocking signal 35, the processing circuit 30 as the calculating unit 15 calculates a difference between the changed decision period 42 and the initial decision period 41 stored in the memory 13, i.e., a difference D1 (=t1−t11) between the time point t1 shown in FIG. 8 and the time point t1 shown in FIG. 9. Then, the processing circuit 30 as the correcting unit 16 corrects the decision period 41 stored in the memory 13 so as to reduce the absolute value of the difference D1 (=t1−t11) as the calculated result. The decision period that is changed by the processing circuit 30 is stored in the memory 13 once again. Accordingly, in the situation that the internal combustion engine 2 is operated under the same conditions after the changed decision period is stored in the memory 13, if the configuration that the changed decision period stored in the memory 13 can be read out to use is employed, such changed decision period that can respond to the knocking occurring timing with good precision can be employed to sense the knocking.

Figure 12:
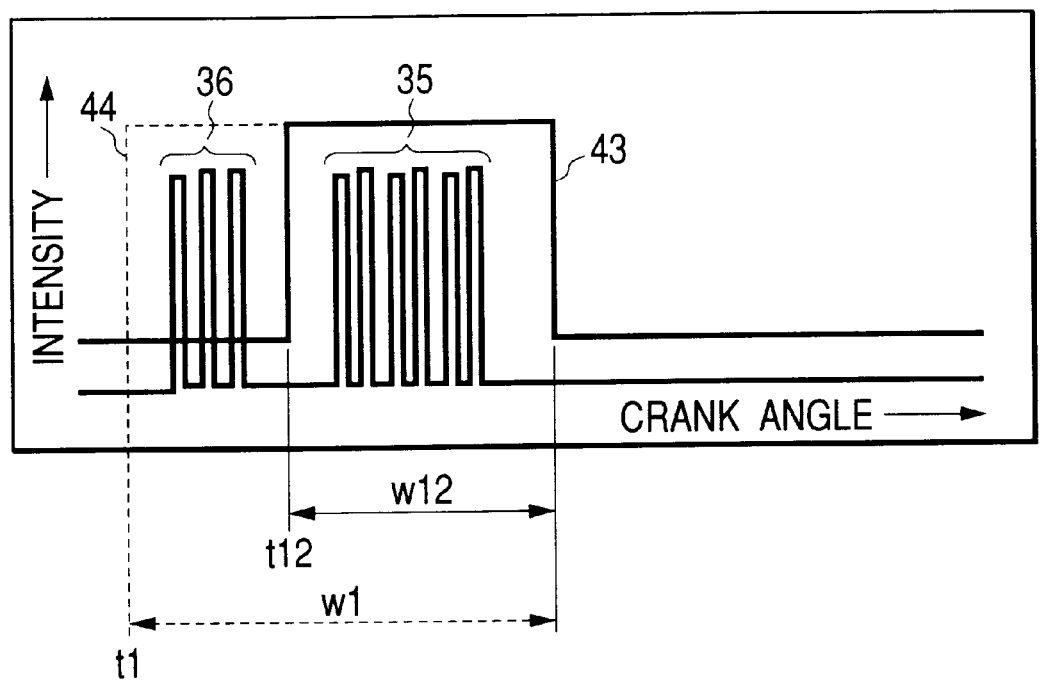
FIG. 12 is view showing a state in which changes of both time point and period of the decision period match the knocking occurring timing with a decision period 43.

FIG. 12 is a view showing the state that the decision period 43 is mated with the knocking occurring timing by changing both the time point and the period of the decision period. Both the knocking signal 35 and the noise 36 other than the knocking signal, e.g., the sensed output of the vibration generated at the ignition timing, are contained in the time point t1 and the period w1 of the initial decision period 44 shown in FIG. 12. Thus, since the counted number of the peak value of the output of the knock sensor 3 in the decision period 44 becomes 9, i.e., is in excess of the predetermined value α (=6), it is decided by the processing circuit 30 that the output of the knock sensor 3 extracted within the decision period 44 contains the noise 36. Because the initial decision period 44 has the longer period w1, it is difficult to match the decision period 44 with the knocking signal 35 only such that the noise is not contained in the decision period 44. As a result, if it is decided that the output of the knock sensor 3 contains the noise 36, the sense of the knocking signal 35 can be facilitated by changing both the time point t1 and the period w1 of the decision period 44, i.e., changing the time point from t1 to t12 and changing the period from w1 to the period w12 that is shorter than w1. Since the counted number of the peak value contained in the time point t12 and the period w12 as the changed decision period 43 shown in FIG. 12 is 6 and is less than or equal to the predetermined value α (=6), it is decided that the output of the knock sensor 3 does not contain the noise 36 but contains the knocking signal 35.

As described above, the decision period is constructed by the time point t1 that is decided in the cycle of the internal combustion engine 2 and the period w1 that elapses from the time point t1 as the starting point. Since any one or both of the time point t1 and the period w1 can be changed in answer to the knocking occurring timing to avoid the occurring timing of the noise 36, it is possible to improve the knocking sensing precision.

In this case, even if the period w12 of the changed decision period 43 is set excessively short, in some cases the knocking signal 35 is caught in the decision period 43 even after such decision period is changed and thus it is difficult to mate the decision period 43 with the knocking signal 35. Therefore, the processing circuit 30 as the calculating unit 15 calculates a difference D2 (=w12−10 degree) between the period w12 of the changed decision period 43 and the predetermined value, e.g., 10 degree in the crank angle (CA) range. As the result of calculation, if the difference D2 (=w12−10 degree) is minus, i.e., the period w12 is below 10 degree in the CA range, the processing circuit 30 outputs the instruction, which changes the after-changing period w12 into the before-changing period w1 again, to the changing unit 14. According to this, such a problem can be overcome that the period of the decision period is set too short and thus it is difficult to catch the output of the knock sensor within the decision period.

Figure 13:
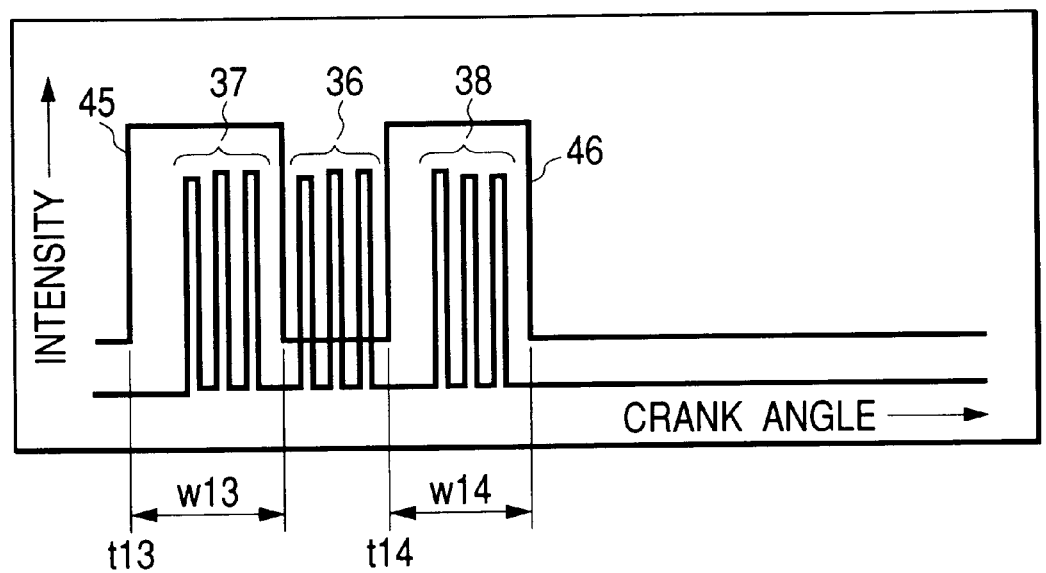
FIG. 13 is a view showing a state in which a plurality of decision periods are set in one cycle of an internal combustion engine 2.

FIG. 13 is a view showing the state that plural decision periods are set in one cycle of the internal combustion engine 2. According to the operation state of the internal combustion engine 2, there is the case where the period in which the knocking occurring frequency is high is not concentrated into a particular timing in one cycle and such period is present at plural timings separately. In such case, the period that is present separately in plural and has the high knocking occurring frequency can be contained in the decision period by extending the period w1 of the decision period, nevertheless there is the problem such that the occurring timing of the noise 36 is also contained in the decision period and thus the knocking sensing precision is lowered. As the means for overcoming this problem, a plurality of decision periods can be set in one cycle of the internal combustion engine 2. In FIG. 13, two decision periods are provided in one cycle.

The setting of two decision periods in one cycle can be implemented by storing previously a time point t13 and a period w13 using the time point t13 as the starting point in a first decision period 45 and a time point t14 and a period w14 using the time point t14 as the starting point in a second decision period 46 into ROM of the input unit 12 respectively, and then reading them from ROM of the input unit 12 at the initialization to input into the processing circuit 30. Also, the change of the decision period can be implemented by providing the output of the processing circuit 30 to the changing unit 14 in compliance with the changing logics that correspond to the first and second decision periods 45, 46 respectively.

In case the first and second decision periods 45, 46 are provided in one cycle, it is decided by the processing circuit 30, based on a sum of the counted number of the peak value of a knock sensor output 37 extracted in the first decision period 45 and the counted number of the peak value of a knock sensor output 38 extracted in the second decision period 46, whether or not the output of the knock sensor contains the noise 36. In FIG. 13, since the sum of the counted number of the peak value extracted in the first and second decision periods 45, 46 is less than the predetermined value α (=6), it is possible to decide that the output of the knock sensor is the knocking signal. Also, as shown in FIG. 13, if the timing at which the noise 36 occurs, e.g., the ignition timing, exists between two periods that have the high knocking occurring frequency, the first and second decision periods 45, 46 can be set so as to avoid the occurring timing of the noise 36. Therefore, the knocking sensing precision can be improved.

As described above, according to the embodiment of the present invention, the number of the decision period that is provided in plural in one cycle of the internal combustion engine 2 is 2, but the present invention is not limited to this value. The number of the decision period, which is in excess of 2, may be employed. Also, the number of the peak value of the output of the knock sensor 3, which is used as the reference to decide whether or not the output of the knock sensor contains the noise, is the number of more than 6, but the present invention is not limited to this value. Such value may be set appropriately according to the type and the operation state of the internal combustion engine. In addition, the length of the period as the reference, which is use to decide whether or not the period of the changed decision period is below the predetermined value and also to change into the before-changing decision period once again, is set to 10 degree in the crack angle range, but the present invention is not limited to this value. Such value may be set appropriately according to the type and the operation state of the internal combustion engine.

According to the present invention, the previously-set decision period can be changed by the changing unit to contain the output of the vibration generated by the knocking, and also the difference between the changed decision period and the decision period stored in the storing unit is calculated and then the decision period stored in the storing unit can be corrected based on the calculated result. According to this, even if the knocking occurring timing is varied in the cycle of the internal combustion engine, the decision period can be changed to respond to the knocking occurring timing and thus the knocking can be sensed with good precision. Also, since the decision period stored in the storing unit based on the decision period that has been changed to respond to the knocking occurring timing, can be corrected, the corrected decision period that can answer to the knocking occurring timing with good precision can be employed to sense the knocking when the internal combustion engine is operated under the same conditions.

Also, according to the present invention, the decision period consists of the time point t1 and the period w1 decided in the cycle of the internal combustion engine, and the decision period can be set or changed by selecting any one or both of the time point t1 and the period w1 so as to respond to the knocking occurring timing. Therefore, the improvement of the knocking sensing precision can be achieved.

Also, according to the present invention, the time point t1 of the decision period is decided every cylinder of the internal combustion engine in response to the operation conditions such as the engine speed, the fuel injection quantity, etc. According to this, even if the operation state is different every cylinder, the decision period is set respectively to respond to the timing at which the knocking occurring frequency is high. Therefore, the improvement of the knocking sensing precision can be achieved.

Also, according to the present invention, the deciding unit for deciding whether or not the output of the knock sensor contains the noise, based on the number of the peak value of the output of the knock sensor that exceeds the predetermined decision level, is provided, and the decision period is changed in response to the output of the deciding unit. According to this, since it can be decided whether or not the knocking occurs, based on the output of the knock sensor that does not contain the noise within the decision period, the knocking sensing precision can be improved. Also, since the noise deciding unit can be attained by the simple structure and there is no necessity to provide the noise sensing device separately, the size reduction of the system and the suppression of the production cost can be achieved.

Also, according to the present invention, if the changed decision period is smaller than the predetermined value, the changed decision period can be changed into the preceding decision period once again. According to this, it is possible to overcome the problem such that the decision period is set too short and thus it becomes difficult to catch the output of the knock sensor within the decision period.

Also, according to the present invention, plural decision periods can be provided in one cycle of the internal combustion engine. According to this, if a plurality of timings at which the knocking occurring frequency is high are present in the cycle, the decision periods can be decided respectively so as to respond to such plural timings at which the knocking occurring frequency is high. Also, since a plurality of decision periods are provided, the decision periods can be decided to avoid the noise occurring timing. Therefore, the improvement of the knocking sensing precision can be achieved.

Also, according to the present invention, the presence of the knocking occurrence is decided based on the logical sum of the knocking sensor outputs in plural decision periods. Therefore, the knocking sensing precision can be improved.

What is claimed is:

1. A knocking control apparatus for an internal combustion engine, comprising:

a knock sensor for sensing a knocking of the internal combustion engine;

a crank angle sensor for sensing a rotation angle position of a crank provided to the internal combustion engine;

a setting unit for setting a decision period in which an output of the knock sensor is extracted to decide whether the knocking occurs in response to an output of the crank angle sensor;

a storing unit for storing the decision period;

a changing unit for changing the set decision period to contain the output of the knock sensor in response to the knocking with a situation in which the knocking occurs;

a calculating unit for calculating a difference between the decision period, which is changed to contain the output of the knock sensor in response to the knocking, and the decision period, which is stored in the storing unit; and a correcting unit for correcting the decision period stored in the storing unit in response to an output of the calculating unit to reduce an absolute value of the difference.

2. The knocking control apparatus according to claim 1, wherein the decision period is a time point t1, which is defined in a cycle of the internal combustion engine, and a period w1, which lapses from the time point t1 as a starting point.

3. The knocking control apparatus according to claim 2, wherein the time point t1 is defined differently every cylinder of the internal combustion engine;

wherein the time point t1 is defined to be lagged in the cycle of the internal combustion engine as an engine rotation speed is increased higher; and wherein the time point t1 is defined to be lagged in the cycle of the internal combustion engine as a fuel injection quantity is reduced smaller.

4. The knocking control apparatus according to claim 1, further comprising:

a deciding unit for deciding whether the output of the knock sensor contains a noise that is a sensed output of a vibration other than a vibration that is generated by the knocking, wherein if the output of the knock sensor contains the noise, the changing unit changes the decision period in response to an output of the deciding unit.

5. The knocking control apparatus according to claim 4, wherein the deciding unit calculates number of a peak value of the output of the knock sensor, which exceeds a predetermined decision level, in the decision period; and wherein the deciding unit decides that the output of the knock sensor contains the noise if the number of the peak value exceeds a predetermined decision value.

6. The knocking control apparatus according to claim 1, wherein the calculating unit further calculates a difference between the decision period changed by the changing unit and a predetermined value; and wherein the changing unit changes an after-changing decision period to a before-changing decision period in response to the output of the calculating unit if the decision period is below the predetermined value.

7. The knocking control apparatus according to claim 1,
wherein the decision period is a plurality of decision periods; and
wherein the plurality of the decision periods are set in one cycle of the internal combustion engine.

8. The knocking control apparatus according to claim 7,
wherein the deciding unit counts numbers of the peak value of the output of the knock sensor, which exceeds a predetermined decision level, in each of decision periods set in one cycle of the internal combustion engine; and
wherein the deciding unit decides based on a sum of the numbers whether the output of the knock sensor contains a noise.

* * * * *